(12) United States Patent
Eulitz

(10) Patent No.: US 10,065,497 B2
(45) Date of Patent: Sep. 4, 2018

(54) FILLING SYSTEM ON A MOTOR VEHICLE, HAVING AT LEAST TWO STORAGE TANKS FOR LIQUID OR GASEOUS OPERATING MATERIALS

(71) Applicant: KAUTEX TEXTRON GMBH & CO. KG, Bonn (DE)

(72) Inventor: Dirk Eulitz, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 15/535,223

(22) PCT Filed: Dec. 8, 2015

(86) PCT No.: PCT/EP2015/078978
§ 371 (c)(1),
(2) Date: Jun. 12, 2017

(87) PCT Pub. No.: WO2016/091875
PCT Pub. Date: Jun. 16, 2016

(65) Prior Publication Data
US 2017/0341509 A1    Nov. 30, 2017

(30) Foreign Application Priority Data

Dec. 11, 2014 (DE) .................. 10 2014 118 400

(51) Int. Cl.
*B60K 15/073* (2006.01)
*B60K 15/04* (2006.01)
(Continued)

(52) U.S. Cl.
CPC ............ *B60K 15/073* (2013.01); *B60K 15/04* (2013.01); *B60K 2015/03118* (2013.01); *B60K 2015/03157* (2013.01); *F02M 37/0088* (2013.01)

(58) Field of Classification Search
CPC .................. B60K 15/04; B60K 15/073; B60K 2015/03118; B60K 2015/03157
(Continued)

(56) References Cited

U.S. PATENT DOCUMENTS 4,852,892 A * 8/1989 Reid .................... B60K 15/073
137/874
6,170,535 B1    1/2001 Sadr et al.
(Continued)

FOREIGN PATENT DOCUMENTS

DE           10304556       9/2004
DE         202010000796     8/2010
(Continued)

OTHER PUBLICATIONS

English translation of International Search Report received in corresponding PCT Appln. No. PCT/EP2015/078978, dated May 23, 2016.
(Continued)

*Primary Examiner* — Anne Marie M Boehler
*Assistant Examiner* — Felicia L. Brittman
(74) *Attorney, Agent, or Firm* — Grossman, Tucker, Perreault & Pfleger, PLLC

(57) ABSTRACT

A filling system on a motor vehicle, having at least two storage tanks for operating materials, comprising a tank closure cover which closes an opening in a body of the motor vehicle and is movable from a first position that closes the opening into a second position that releases the opening, wherein at least two filling openings of the storage tanks are arranged below the tank closure cover, a filler trough that forms an enclosure of the filling opening, wherein the filler trough closes the opening in the body and is fixed to the body; and at least one filler head, wherein the filling openings are formed as a part of the filler head, the filler head
(Continued)

defining at least two mouth-hole necks which are combined to form a common component and are integrally connected to each other, each mouth-hole neck forming a filling opening for another storage tank.

14 Claims, 3 Drawing Sheets

(51) Int. Cl.
  *B60K 15/03* (2006.01)
  *F02M 37/00* (2006.01)
(58) Field of Classification Search
  USPC .................................................. 280/834
  See application file for complete search history.

(56) References Cited

U.S. PATENT DOCUMENTS

| | | | |
|---|---|---|---|
| 6,263,924 | B1 | 7/2001 | Grosser |
| 6,968,874 | B1 | 11/2005 | Gabbey et al. |
| 8,382,187 | B2 | 2/2013 | Guendouz et al. |
| 8,926,004 | B2 | 1/2015 | Betzen et al. |
| 9,539,964 | B2 | 1/2017 | Koith |
| 2009/0145903 | A1 | 6/2009 | Soltis et al. |
| 2010/0012205 | A1 | 1/2010 | Vandervoort et al. |
| 2011/0240640 | A1 | 10/2011 | Hagano |

FOREIGN PATENT DOCUMENTS

| | | | |
|---|---|---|---|
| DE | 102012022129 | 5/2014 | |
| DE | 102012023655 | 5/2014 | |
| DE | 102015222669 A1 * | 5/2017 | ............ B60K 15/05 |
| EP | 1449702 | 8/2004 | |
| JP | H3-30686 | 3/1991 | |
| JP | H5-186606 | 7/1993 | |
| JP | 2002-530249 | 9/2002 | |
| JP | 2002-530603 | 9/2002 | |
| JP | 2004-115-097 | 4/2004 | |
| JP | 2006-160093 | 6/2006 | |
| JP | 2008-049952 | 3/2008 | |
| JP | 2011-213128 | 10/2011 | |
| JP | 2012-158215 | 8/2012 | |
| WO | 2006/035013 | 4/2006 | |
| WO | 2007/042536 | 4/2007 | |
| WO | 2012/071124 | 5/2012 | |

OTHER PUBLICATIONS

English translation of International Preliminary Report on Patentability received in corresponding PCT Application No. PCT/EP2015/078978, dated Jun. 15, 2017.

* cited by examiner

FILLING SYSTEM ON A MOTOR VEHICLE, HAVING AT LEAST TWO STORAGE TANKS FOR LIQUID OR GASEOUS OPERATING MATERIALS

FIELD

The invention concerns a filling system on a motor vehicle, having at least two storage tanks for liquid or gaseous operating materials, comprising a tank closure cover which closes an opening in the body of the motor vehicle and can be brought from a first position which closes the opening into a second position which releases the opening, wherein at least two filling openings of the storage tanks are arranged below the tank closure cover and are concealed in the first position of the tank closure cover, and comprising a filler dish which forms a surround of the filling openings, wherein the filler dish closes the opening in the body of the motor vehicle on the vehicle side and wherein the filler dish is fixed to the body of the motor vehicle.

BACKGROUND

Filling systems on motor vehicles, with filling openings for different storage tanks which are arranged below a common tank closure cover, are known in principle in the prior art, for example from EP 1 449 702 A2, WO 2006/035013 A1, U.S. Pat. No. 4,852,892 A or from US 2010/0012205 A1.

The filling system known from U.S. Pat. No. 4,852,892 A for example, in a variant shown in FIG. 3 of the publication, comprises a single filler neck with a single filling opening and two filling channels, each of which leads to a separate fuel container.

Recently, in particular for diesel cars, exhaust gas denitrification systems have become established, in particular systems which work on the principle of selective catalytic exhaust gas reduction by means of a watery urea solution which is injected into the exhaust line of the vehicle. For this, it is necessary to store the urea solution in the motor vehicle. The tanks for receiving urea solution are dimensioned and arranged such that they can be filled in the workshop from drums when the vehicle is serviced at normal service intervals. Increasingly, there is a need for the urea tank to be refillable by the vehicle keeper, which leads to the necessity for providing a filler neck for a watery additive for exhaust gas denitrification which is accessible from the outside of the vehicle.

It is therefore known in principle to provide, as well as a filler neck for fuel, at least one further filler neck for filling a secondary fluid container, such as for example an additive container, below the tank closure cover of the motor vehicle.

The technical problem of such a common arrangement of a plurality of filler necks below a single tank closure cover is the space available for installation inside the body of the motor vehicle. Firstly, the space must be sufficient for the two systems to be arranged below a single tank closure cover, secondly the systems must be arranged such that any closure caps provided on the filling openings can still be operated, in the sense of fitted and removed via a screw thread. This necessarily leads to the tank closure cover assuming certain dimensions which are not aesthetically pleasing. For small vehicles in particular, relatively large tank closure covers are stylistically displeasing.

To solve this problem, US 2010/0012205 A1 proposes a filling system which comprises a first and a second filling opening inserted in a panel which can be displaced longitudinally. The panel is displaceable inside the body of the vehicle between a first configuration and a second configuration, wherein in the first configuration a first filling opening is arranged aligned with a fixed opening in the body of the motor vehicle, and wherein in the second configuration the second filling opening is arranged aligned with this opening. This solution requires an electric adjustment mechanism and in addition takes up a relatively large installation space inside the body of the motor vehicle. Undoubtedly, one advantage of this arrangement is that the opening in the body of the motor vehicle can be kept relatively small, and a correspondingly small tank closure cover is required.

SUMMARY

The invention is therefore based on the object of improving the filling system described above on a motor vehicle such that, while adequately meeting aesthetic requirements, it takes up as little installation space as possible and has a relatively simple mechanical design.

This object is achieved by the features of claim 1. Advantageous embodiments of the invention arise from the subclaims.

One aspect of the present invention concerns a filling system on a motor vehicle, having at least two storage tanks for liquid or gaseous operating materials, comprising a tank closure cover which closes an opening in the body of the motor vehicle and can be brought from a first position which closes the opening into a second position which releases the opening, wherein at least two filling openings of the storage tanks are arranged below the tank closure cover and are concealed in the first position of the tank closure cover, a filler dish which forms a surround of the filling openings, wherein the filler dish closes the opening in the body of the motor vehicle on the vehicle side and wherein the filler dish is fixed to the body of the motor vehicle, furthermore comprising at least one filler head, wherein the filling openings are formed as part of the filler head, wherein the filler head defines at least two mouthpiece necks which are combined to form a common component and are integrally connected to each other, and wherein each mouthpiece neck forms a filling opening for a different storage tank.

The term "operating materials" in the sense of the invention means fuel, i.e. liquid or gaseous fuel, and also additives, oil, water or also washing fluids.

The invention is described below in particular with reference to a combination of the fuel tank and an additive container as storage tanks in the sense of the invention, although the invention is not restricted to this particular combination of storage tanks. The problem on which the invention is based in principle always arises if the motor vehicle comprises two or more storage tanks for different operating materials of the vehicle, which must be accessible from the outside on the body for refilling by the vehicle driver.

The term "filler dish" in the sense of the invention means in particular a surround of the filling openings which, as well as the function of closing the opening in the body of the motor vehicle on the vehicle side, also performs the function of compensating for tolerances between the filler head and the body of the vehicle, and does not obstruct the planned introduction of fluid into the space enclosed by the body.

The filler head according to the invention may be inserted tightly in a corresponding receiver of the filler dish. A correspondingly formed opening in the filler dish as a receiver for the filler head is suitably adapted to the outer contour of the filler head.

In particular because the filling openings for different storage tanks are formed as a common component in a filler head, the installation space required for filling several storage tanks may be significantly reduced. The filling openings may be positioned with the minimum possible distance from each other, which requires the smallest installation space possible.

The design according to the invention furthermore has the advantage that only a single body-side fixing or body-side connection of the filler head is required.

Suitably, the filler head is injection-molded from thermoplastic material. The filler head may for example be assembled from several injection-molded components.

The filler head may be formed for example from a thermoplastic elastomer or another relatively soft thermoplastic material.

In particular if the filler dish is made from a thermoplastic elastomer, there is no need to provide additional sealants in the region of the surround of the filling openings or the filler head, and in some cases also in the region of the connection of the filler dish to the body of the motor vehicle.

The filler head may for example comprise two or more outlets to the storage tanks, which are formed for example as filler pipes for separate storage tanks or to which a respective filler pipe for a storage tank is connected. The filler pipes may be made of thermoplastic material, flexible or rigid, and each connected to the outlets of the filler head. For example, the filler pipes may be pushed onto or stretched over the outlets of the filler head, or attached thereto by means of clamps.

Alternatively for example, at least one filler pipe may be formed integrally on the filler head.

In a particularly preferred and advantageous variant of the filling system according to the invention, it is provided that the filler head is formed at least partially electrically conductive, and is connected electrically conductively to the body of the vehicle. Such a design of the filler head is advantageous in particular because, in the filling system according to the invention, both a filling channel for fuel defined by the filler head, and one defined by the filler head for the other operating fluid can be earthed electrically. Preferably, at least one of the filling channels is itself made of an electrically conductively filled plastic.

This may be achieved for example particularly easily if the filler head formed from a thermoplastic material comprises an electrically conductive filler. The electrically conductive filler is preferably selected from a group comprising carbon, soot, carbon fibers, metal particles and ferrite particles.

Alternatively or additionally, the filler head may comprise a metal surround and/or a metal insert which is connected electrically conductively to the body of the motor vehicle. A metal insert may for example be a so-called earth spike which extends into at least one filling channel of the filler head. Alternatively, a metal hopper may be provided within at least one filling channel.

Suitably, the filler head according to the invention is attached to a supporting part of the body of the motor vehicle, while the filler dish may be attached to the outer body of the motor vehicle.

In a particularly preferred variant of the filling system according to the invention, it is provided that the filler head comprises at least one closure flap mechanism which seals at least one filling opening without a filler cap. This system is generally known as a "capless" system. In this way, a further substantial saving in installation space is achieved, since no additional space need be provided for handling a closure cap within the space enclosed by the filler dish. At least one closure cap, preferably that for the fuel filling opening, could be omitted in such a system.

It is suitable if the integrated closure flap mechanism is connected electrically conductively to the body of the motor vehicle.

Suitably, the filler head has a filling channel for fuel and a filling channel for a watery additive for selective catalytic exhaust gas denitrification, wherein the closure flap mechanism closes the filling channel for fuel.

It is particularly suitable if the closure flap mechanism can be locked and unlocked electrically, and/or can be actuated electrically and/or pneumatically.

The filler head may for example be made of a thermoplastic material with a carbon-fiber filling, which is proportioned such that it creates both an electrical conductivity of the filler head and a structural reinforcement of the filler head.

The mouthpiece necks forming the filling opening and surrounding the respective filling channels are adapted in their design to the operating medium to be filled. Thus one mouthpiece neck may be configured in the normal manner for receiving a fuel nozzle, while the other mouthpiece neck may be configured to receive a nozzle for a watery additive for selective catalytic exhaust gas denitrification. This mouthpiece neck may also have an external thread for receiving a union nut connection from a filler drum, such as for example a so-called "Kruse cylinder". The mouthpiece neck may also comprise a magnet for releasing a nozzle.

The filler head according to the invention may furthermore comprise at least one fast venting valve or fast purging valve for at least one storage tank, wherein the fast purging valve or fast venting valve receives a control signal which is generated by activation of the tank closure cover or by activation of the closure flap mechanism. Such a fast purging or fast venting may for example be desirable and advantageous if one of the storage tanks is configured as a pressure tank for a hybrid vehicle.

In order to guarantee the function of filler shut-off on filling of a storage tank, it is sensible if means are provided on the filler head for actuating one or more service purge valves. The means for actuating the service purge valve may for example be a switch element extending into a filling channel Alternatively, activation may take place by a control signal which is generated either by activation of the closure flap mechanism or by activation of the tank closure cover.

BRIEF DESCRIPTION OF THE DRAWINGS

The invention is now explained below with reference to an exemplary embodiment shown in the drawings.

The drawings show.

DETAILED DESCRIPTION

Figure 1:
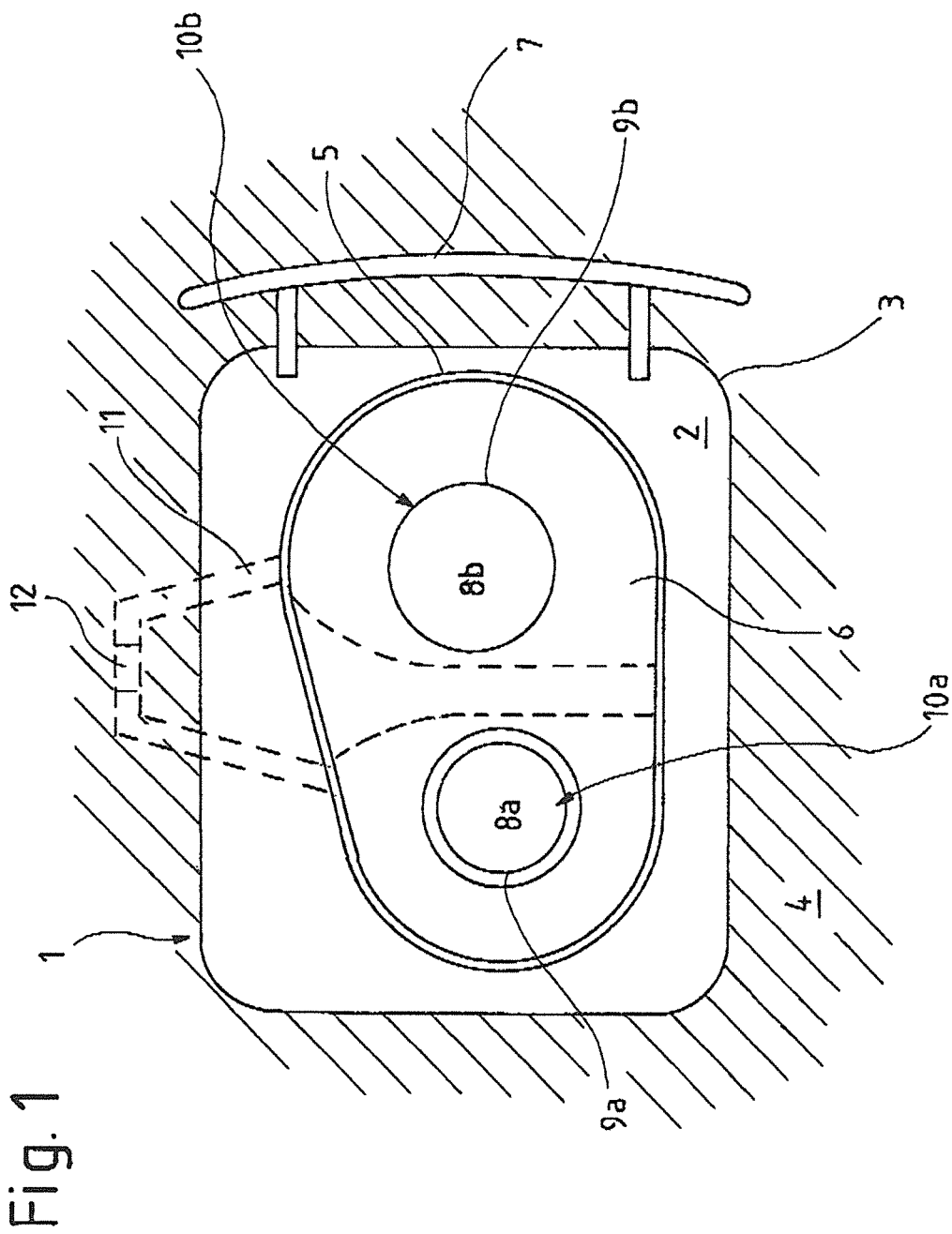
FIG. 1 is a top view of the filler dish of the filling system according to the invention on a motor vehicle with the tank closure cover opened.

Reference is first made to FIG. 1 which shows a top view of the opened filler dish 2 of a filling system 1 according to the invention. The filler dish 2 forms the closure on the vehicle side of an opening 3 in the body 4 of a motor vehicle. It is formed for example from a dish-shaped gaiter made of TPE (thermoplastic elastomer). The filler dish 2 comprises an opening 5 which is formed as a receiver for a filler head 6. The filler dish 2 can be closed by means of a tank closure cover 7 hinged pivotably on the body 4 of the motor vehicle.

In the position of the tank closure cover 7 shown in FIG. 1, the filler dish 2 is open so that the tank closure cover 7 releases two filling openings 8a, 8b, whereas in the closed position (not shown), the tank closure cover 7 conceals the filling openings 8a, 8b. The filling opening 8a shown on the left in FIG. 1 is provided as a filling opening for a watery additive for selective catalytic exhaust gas denitrification, while the filling opening 8b shown on the right in FIG. 1 is provided as a filling opening for fuel.

The filling openings 8a, 8b are an integral part of the filler head 6, formed integrally of thermoplastic material. Each of the filling openings 8a, 8b comprises a mouthpiece neck 9a, 9b which delimits a respective filling opening 8a, 8b.

Each of the filling openings 8a, 8b leads into a filling channel 10a, 10b.

Figure 2:
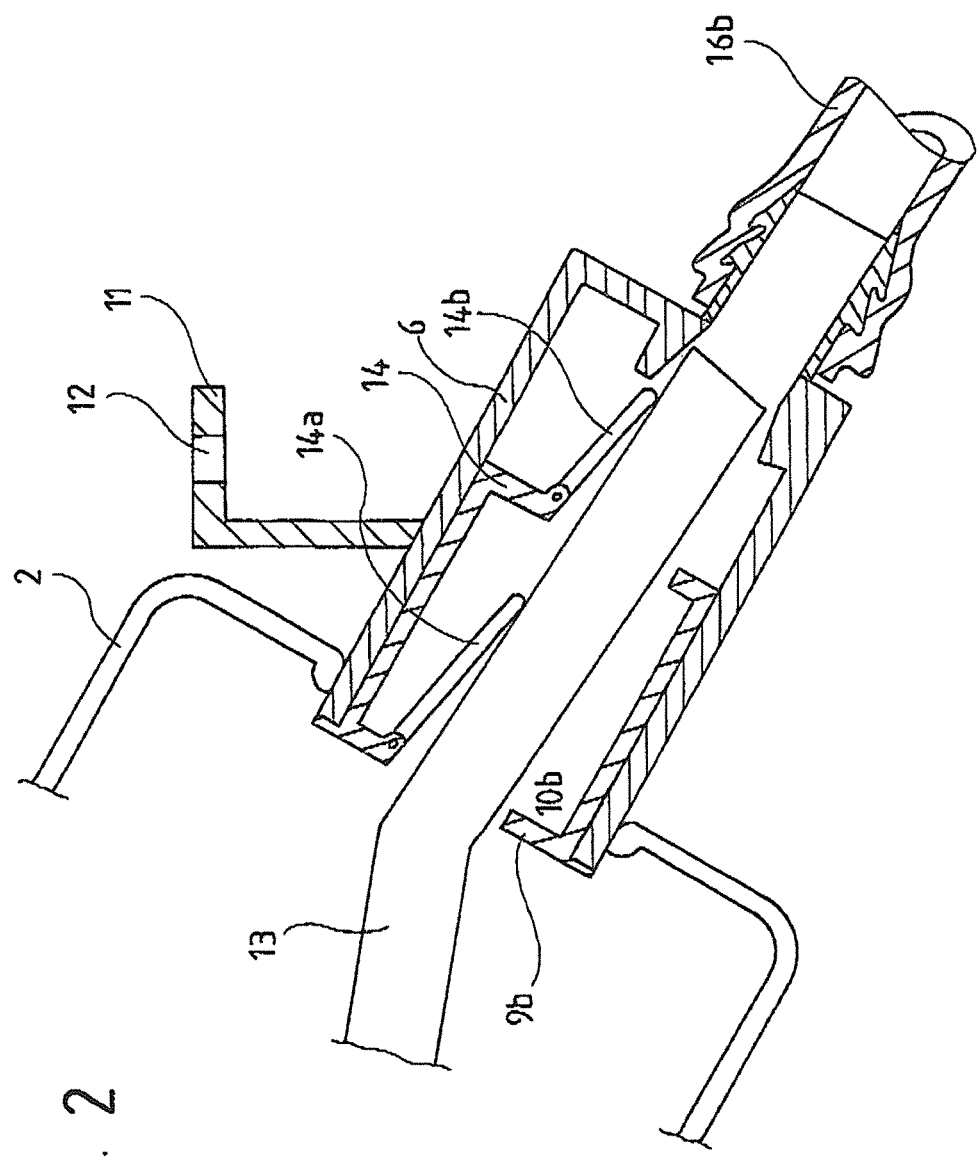
FIG. 2 is a section view through the arrangement shown in FIG. 1 during filling.

In the filling system 1 shown in the figures, in which the filling channel 10b is configured as a fuel filling channel, said system is formed as a capless system, i.e. without a closing cap which can be screwed on from the outside, but with an integrated closure flap mechanism as shown in FIG. 2. The drawing is greatly simplified in regard to the closure flap mechanism.

The filler head 6 is provided with an integrally molded fixing bridge 11 which has one or more fixing bores 12 via which the filler head 6 can be fixed to supporting parts of the body 4 of the motor vehicle.

The fixing bridge 11, like the filler head 6, may be formed from a thermoplastic material with a conductive filling, so that via the fixing bridge 11, a conductive connection can be made to electrically conductive parts of the body 4 of the motor vehicle.

Reference is now made to the section view in FIG. 2 which shows a section through parts of the filling system 1 in the region of the filling channel 10b with nozzle 13 inserted in the filling channel 10b.

FIG. 2 does not show the connection of the filler dish 2 to the body 4 of the motor vehicle. Otherwise, the same components carry the same reference numerals.

The filling channel 10b of the filler head 6 surrounds a closure flap mechanism 14 inserted therein, which comprises a first and a second closing flap 14a, 14b. The first and second closing flaps 14a, 14b may be electrically releasable; these are then opened mechanically by the nozzle 13 when it is inserted in the filling channel 10b, for example against a fail-safe mechanism (not shown).

The filler head 6 furthermore comprises two outlets 15a, 15b onto which respective filler pipes 16b are connected.

Figure 3A:
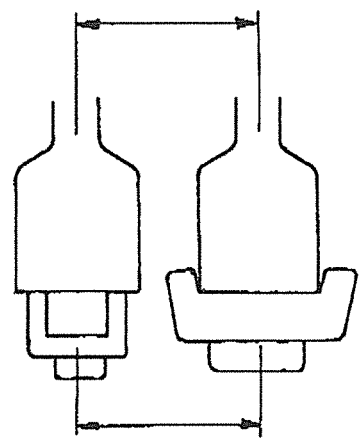
FIGS. 3a and 3b are views which depict a comparison of principle between a filling system according to the prior art and the filling system according to the invention.
Figure 3B:
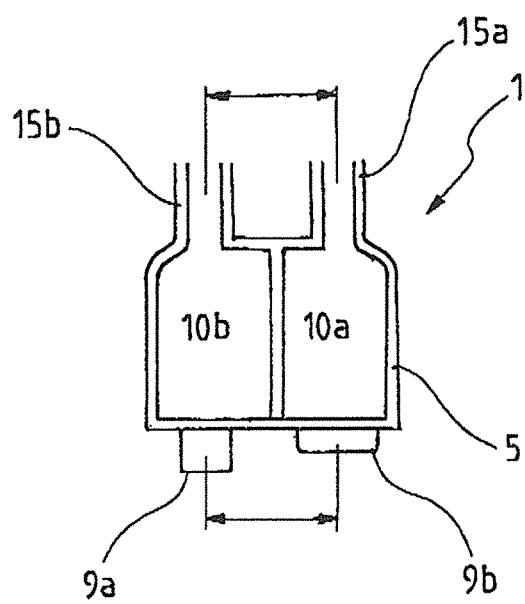

Reference is now made to FIGS. 3a and 3b. The figures illustrate in principle the difference between a filling system 1 according to the invention (FIG. 3b) and a filling system according to the prior art (FIG. 3a). In the system of the prior art, it is evident that because two filler heads must be provided, and the distance between the respective filling openings must necessarily be selected relatively large; whereas with the filling system 1 according to the invention, evidently much less space or installation space is required because both filling openings 8a, 8b (see FIG. 1) are formed as part of the filler head 6 and the filler head 6 defines at least two mouthpiece necks 9a, 9b combined in a common component and formed integrally with each other, each mouthpiece neck 9a, 9b forming a filling opening 8a, 8b for a different storage tank. The depiction in FIGS. 3a and 3b is shown greatly simplified; other functional elements or components of the filler head are not shown here for reasons of simplification.

LIST OF REFERENCE SIGNS

1 Filling system
2 Filler dish
3 Opening
4 Body
5 Opening in filler dish
6 Filler head
7 Tank closure cover
8a Filling opening for additive
8b Filling opening for fuel
9a, 9b Mouthpiece neck
10a, 10b Filling channel
11 Fixing bridge
12 Fixing bore
13 Nozzle
14 Closure flap insert
14a First closure flap
14b Second closure flap
15a, 15b Outlets
16b Filler pipe

What is claimed is:

1. A filling system on a motor vehicle, having at least two storage tanks for operating materials, comprising:
    a tank closure cover which closes an opening in a body of the motor vehicle and is movable from a first position which closes the opening into a second position which releases the opening,
    wherein at least two filling openings of the at least two storage tanks are arranged below the tank closure cover and are concealed in the first position of the tank closure cover,
    a filler dish which forms a surround of the at least two filling openings,
    wherein the filler dish closes the opening in the body of the motor vehicle on a vehicle side,
    wherein the filler dish is fixed to the body of the motor vehicle,
    a filler head,
    wherein the at least two filling openings are formed as part of the filler head,
    wherein the filler head defines at least two mouthpiece necks which are combined to form a common component and are integrally connected to each other, and
    wherein each mouthpiece neck of the at least two mouthpiece necks forms a filling opening of the at least two filling openings for a different storage tank of the at least two storage tanks.

2. The filling system as claimed in claim 1, wherein the filler head is injection-molded from thermoplastic material or is assembled from injection-molded components of thermoplastic material.

3. The filling system as claimed in claim 1, wherein the filler head is formed at least partially electrically conductive, and is connected electrically conductively to the body of the vehicle.

4. The filling system as claimed in claim 1, wherein the filler head is formed of a thermoplastic material which comprises an electrically conductive filler.

5. The filling system as claimed in claim 1, wherein the filler head has a metal surround and/or a metal insert which is connected electrically conductively to the body of the motor vehicle.

6. The filling system as claimed in claim 1, wherein the filler head is fixed to the body of the motor vehicle.

7. The filling system as claimed in claim 1, wherein the filler dish is formed of a thermoplastic elastomer.

8. The filling system as claimed in claim 1, wherein the filler head comprises at least one closure flap mechanism which seals at least one of the at least two filling openings without a filler cap.

9. The filling system as claimed in claim 8, wherein each closure flap mechanism is connected electrically conductively to the body of the motor vehicle.

10. The filling system as claimed in claim 8, wherein the filler head has a filling channel for fuel and each closure flap mechanism closes the filling channel for fuel.

11. The filling system as claimed in claim 8, wherein each closure flap mechanism is lockable and unlockable electrically.

12. The filling system as claimed in claim 8, wherein each closure flap mechanism is actuatable electrically and/or pneumatically.

13. The filling system as claimed in claim 1, wherein the filler head has a filling channel for fuel and a filling channel for a watery additive for selective catalytic exhaust gas denitrification.

14. The filling system as claimed in claim 1, wherein the filler head has a filling channel for fuel and a filling channel for water.

* * * * *